INVENTOR.
ROBERT G. MINER
BY
Holmes & Andersen
ATTORNEYS

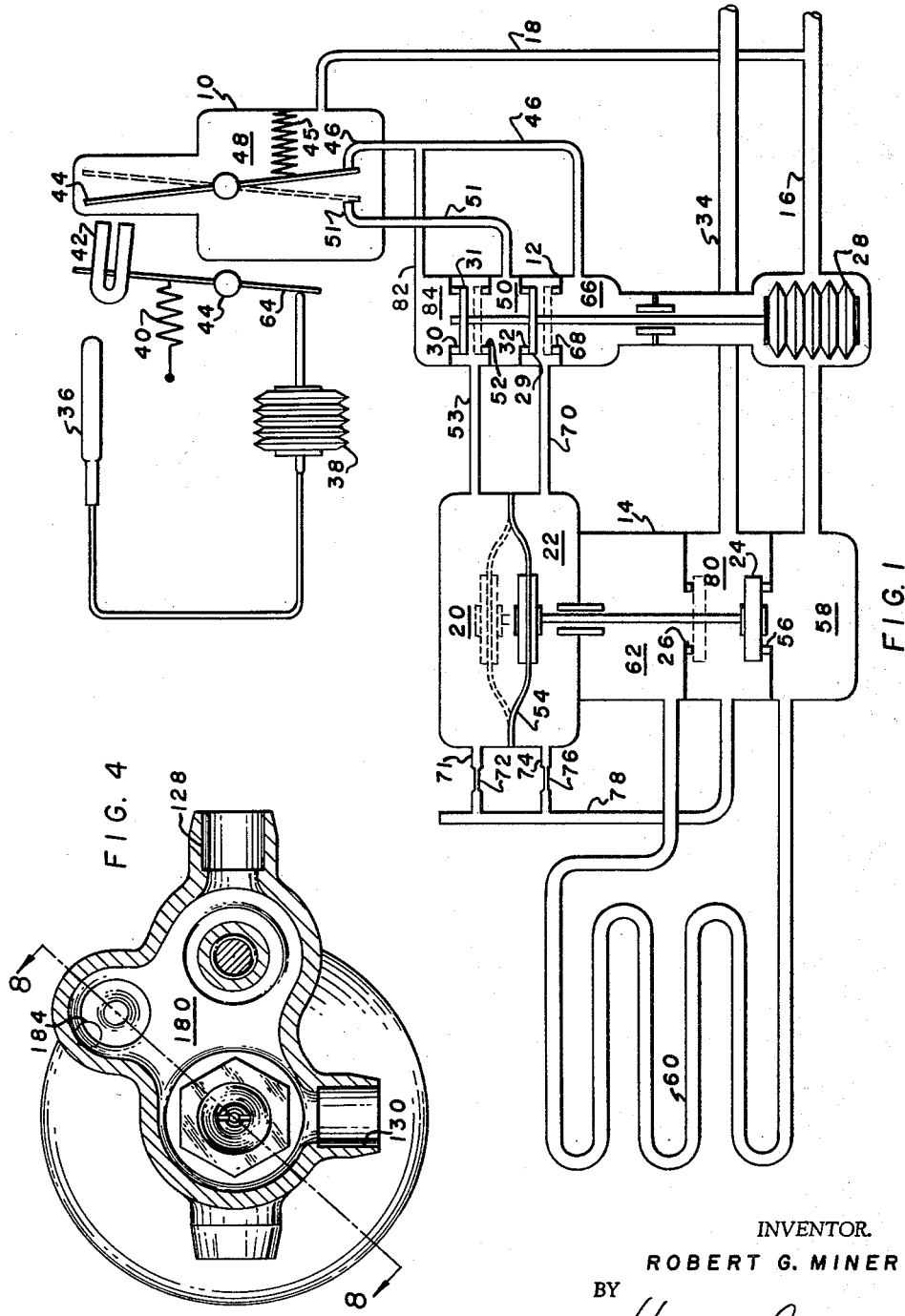

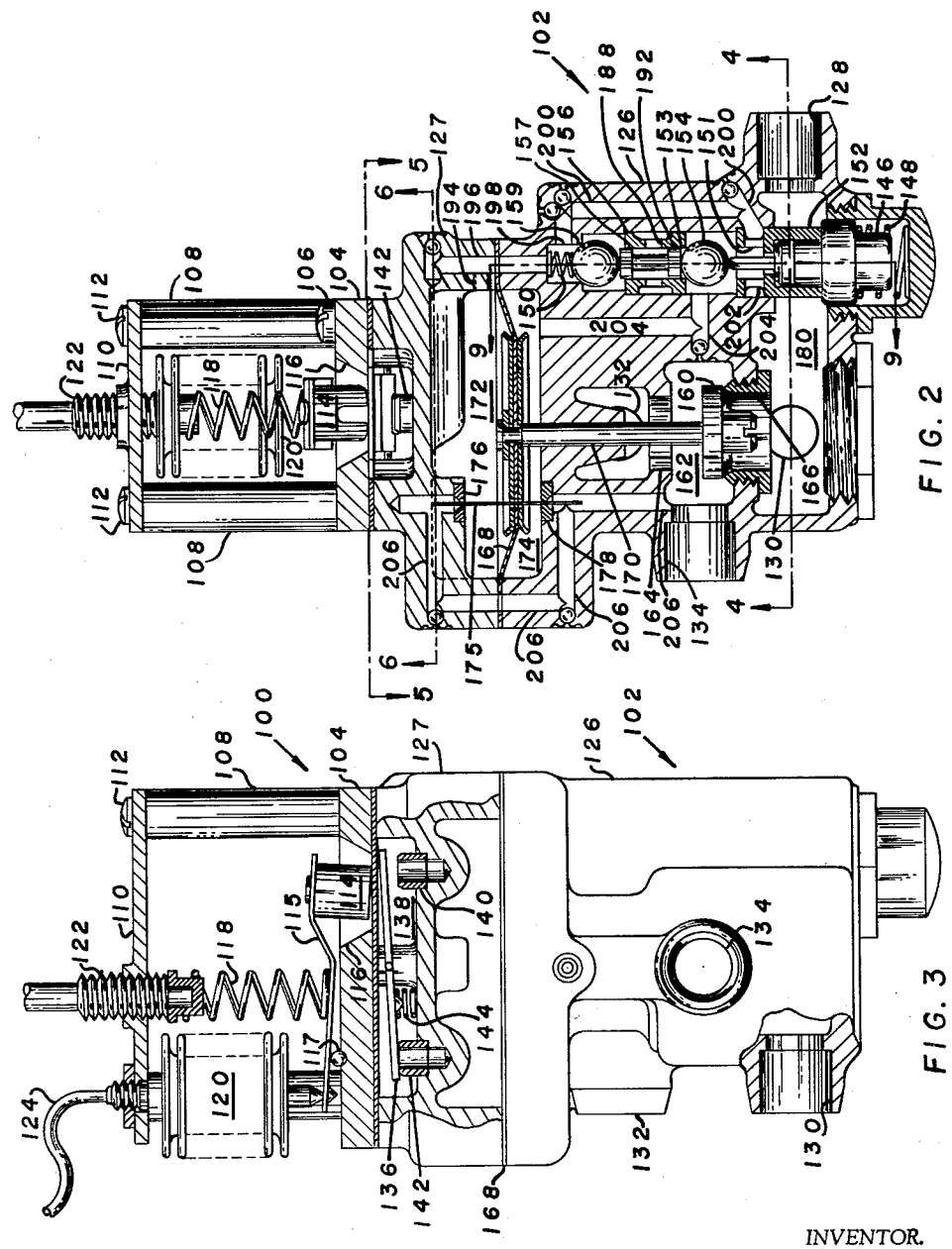

United States Patent Office 3,172,600
Patented Mar. 9, 1965

3,172,600
SELF CONTAINED VALVE
Robert G. Miner, La Crosse, Wis., assignor to The Trane Company, La Crosse, Wis.
Filed Mar. 29, 1962, Ser. No. 183,463
13 Claims. (Cl. 236—1)

This invention relates generally to a self contained valve for use in an air conditioning system and more particularly to a self contained pilot operated valve which employs the heat transfer fluid as a motive means for the valve.

It is an object of the invention to provide a control valve for an air conditioning system or unit which does not require the use of electricity as a motive force for the valve.

Another object of the invention is to provide a self contained valve for an air conditioning system which automatically reverses its operation when the air conditioning system is changed over from summer to winter operation and vice versa.

A third object of the invention is to provide a self contained valve for an air conditioning system which employs the heat transfer fluid of the system as a motive force for the actuation of the valve member.

A still further object of the invention is to provide a self contained valve for an air conditioning system which employs the heat transfer fluid of the system as a motive force for a pilot operated valve member.

A fifth object of the invention is to provide a self reversing, self contained, pilot operated valve for an air conditioning system which employs the heat transfer fluid of the system being controlled as a motive force for actuation of the valve member.

Another object of the invention is to provide a self reversing, self contained, pilot operated, magnetically actuated, snap acting valve for an air conditioning system which employs the heat transfer fluid of the system being controlled as a motive force for actuation of the valve member and which provides magnetic straining of the control fluid.

Other objects and advantages of the invention will be clearly apparent as the specification proceeds to describe the invention with reference to the accompanying drawings in which:

FIGURE 1 is a schematic representation showing the disclosed valve in operative relationship to an air conditioning system;

FIGURE 2 is a cross-sectional view of my new and improved valve;

FIGURE 3 is a side view of the valve shown in FIGURE 2 with the upper portion of the valve in cross section;

FIGURE 4 is a section view taken on line 4—4 of FIGURE 2;

Figure 5:
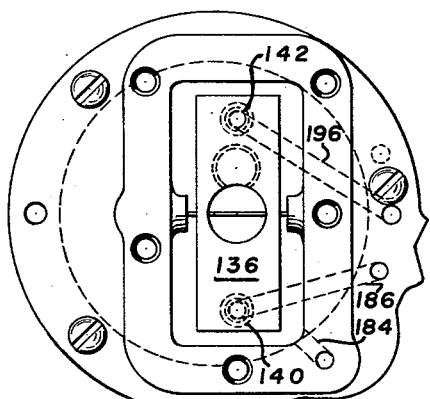
FIGURE 5 is a view taken on line 5—5 of FIGURE 2.

Looking now to the drawings, the illustrated form of the invention is shown in the position when hot heat exchange fluid is being supplied. The schematic operation shown in FIGURE 1 will be explained first to point out the operation of the new and improved self contained valve.

Basically, the valve consists of a pilot valve 10, a reversing valve 12, and a main valve 14. Heat exchange fluid from inlet conduit 16 is delivered to pilot valve 10 through conduit 18. Pilot valve 10 delivers the heat exchange fluid to either top chamber 20 or lower chamber 22 of valve 14, depending on the position of reversing valve 12, causing valve head 24 to either open or close port 26.

*Heating—FIGURE 1*

As shown, hot heat exchange fluid is entering conduit 16 causing temperature responsive element 28 to expand and thereby causing valve heads 29 and 31 to close valve ports 32 and 30 respectively of reversing valve 12. Temperature responsive element 28 is shown located in inlet conduit 16 but may also be located in return conduit 34, if desired.

Temperature responsive bulb 36 is sensing a drop in the area being conditioned indicating a demand for heat and causing bellows 38 to contract, allowing compression spring 40 to force externally located permanent magnet 42 to pivot on pivot member 44 and move towards pilot valve 10. When magnet 42 pivots to a predetermined position, magnetic vane 44 will pivot against the action of compression spring 45 to the position shown in solid line and close pilot nozzle 46.

The heat exchange control fluid will then pass from conduit 18 into pilot valve chamber 48. From pilot valve chamber 48 the control fluid will pass into chamber 50 of reversing valve 12 via pilot nozzle 51, through valve port 52, and into top diaphragm chamber 20 through conduit 53 to act on diaphragm 54 and thereby cause valve head 24 to close valve port 56.

Hot heat exchange fluid will not flow from inlet conduit 16 into valve chamber 58 and thence into heat exchange coil 60 in the area being conditioned. From the heat exchange coil 60 the return water will flow into valve chamber 62 and through valve port 26 into the return or outlet conduit 34.

Assuming now that the temperature in the area sensed by bulb 36 is satisfied, bellows 38 will expand causing lever arm 64 to pivot magnet 42 away from pilot valve 10 against the action of compression spring 40. Compression spring 45 will then pivot magnetic vane 44 to the position indicated in dotted lines opening pilot nozzle 46 and closing pilot nozzle 51.

Control heat exchange fluid will now flow into reversing valve chamber 66 through pilot nozzle conduit 46. From chamber 66 the control fluid will flow into lower diaphragm chamber 22 through valve port 68 and conduit 70 to force diaphragm 54 upwardly into the position shown in dotted lines to cause valve head 24 to move upwardly to the position shown by dotted lines to close valve port 26.

It is obvious that when valve port 26 is closed no warm heat exchange fluid can flow through heat exchange coil 60 since there is no communication between heat exchange coil 60 and the return conduit 34.

Conduit 71 with restrictor 72 therein and conduit 74 with restrictor 76 therein are connected to chambers 20 and 22 respectively to allow one chamber or the other to bleed its control fluid to the return conduit 34 through conduit 78 and valve chamber 80 depending on which chamber the control fluid from the pilot valve is delivered to.

*Cooling—FIGURE 1*

Assuming now that cooling is required in the conditioned area, cold heat exchange fluid will be supplied in inlet conduit 16. Temperature sensitive element 28 will contract pulling valve heads 29 and 31 downwardly to the dotted line position to close valve ports 68 and 52 respectively and thereby reversing the flow connections from the pilot valve 10 to the main valve 14. This reversal of valve 12 causes the action of pilot valve 10 to be reversed.

When temperature responsive bulb 36 senses an increase in temperature above that desired, bellows 38 will expand pivoting magnet 42 away from pilot valve 10 allowing compression spring 45 to move magnet vane 44 to the dotted line position. Control fluid from conduit 18 will flow through conduit 46 and conduit 82 into valve chamber 84. From valve chamber 84 the control fluid will pass into the top diaphragm chamber 20 through valve port 30 and conduit 53 to force diaphragm 54 and valve head 56 downwardly to the position shown in solid lines to close valve port 56 and open valve port 26. Cold heat exchange fluid will now flow from inlet conduit 16 to outlet conduit 24 through valve chamber 58, heat exchange coil 60, valve chamber 62, valve port 26, and valve chamber 80.

When the temperature in the conditioned space reaches a predetermined value, bellows 38 responsive to the temperature sensed by bulb 36 will tend to collapse allowing compression spring 40 to pivot magnet 42 towards magnetic vane 44. Magnetic vane 44 will be attracted to the position in solid lines and open pilot nozzle 51 and close pilot nozzle 46. Control fluid now will be directed from chamber 48 to lower diaphragm chamber 22 through pilot nozzle 51, valve port 32, and conduit 70. The pressure of the control fluid on diaphragm 54 will force the diaphragm upwardly to raise valve 24 to a position where it closes valve port 26. In this position there is no flow through the heat exchange coil 60 since there is no fluid communication between the heat exchange coil and the return conduit 34.

Figure 6:
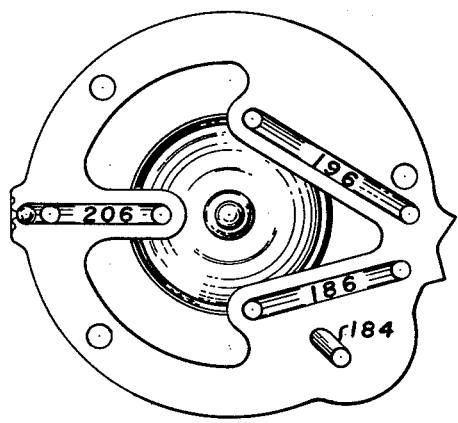
FIGURE 6 is a view taken on line 6—6 of FIGURE 2.
Figure 7:
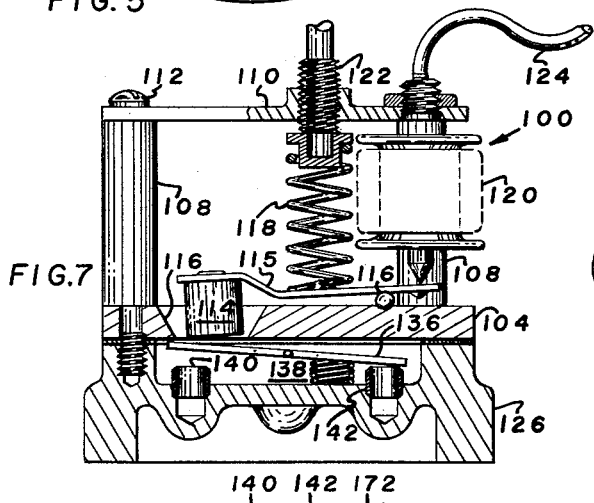
FIGURE 7 is a view similar to FIGURE 3 showing the opposite side of the pilot operator.
Figure 8:
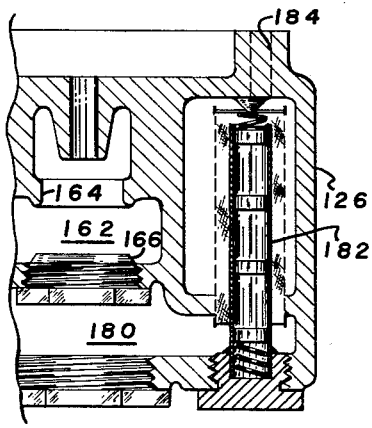
FIGURE 8 is a cross-sectional view taken on line 8—8 of FIGURE 4 with the valve member removed.
Figure 9:
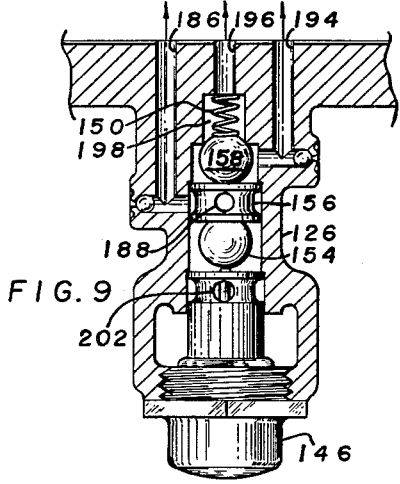
FIGURE 9 is a view partially in cross-section taken on line 9—9 of FIGURE 2.
Figure 10:
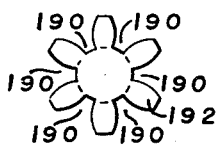
FIGURE 10 is a top view of the valve ball spacer shown in cross section in FIGURE 2.

FIGURES 2–10 show the preferred form of the invention schematically represented in FIGURE 1. The valve of FIGURES 2–10 basically consists of the valve actuation unit 100 and the valve unit 102.

The valve actuator unit 100 is an open type unit with base plate 104 secured to the valve unit 102 by screws 106 or other suitable means. Stud members 108 mounted on the base plate 104 space the top plate 110 from the base plate 104. Screws 112 are provided to rigidly secure the top plate. Magnet 114 is mounted on lever arm 115 and is pivotally secured in opening 116 in the base plate 104 by ball member 117, compression spring 118, and temperature responsive bellows 120. An adjusting screw 122 is rotatably secured in top plate 110 to adjust the tension of compression spring 118. Capillary conduit 124 is shown connected to bellows 120 at one end and connects at the other end to a temperature responsive bulb (not shown) in the space to be conditioned.

Castings 126 and 127 of valve unit 102 house the pilot valve 10, the reversing valve 12, and the main valve 14 referred to in FIGURE 1. Heat exchange fluid enters the valve unit at inlet port 128 and flows to the heat exchange unit from outlet port 130. The heat exchange fluid returning from the heat exchange coil re-enters the valve unit at re-entrant port 132 and returns to the source of supply via return port 134.

The pilot valve is located adjacent the permanent magnet 114 so that the magnet may cooperate with magnetic vane 136 to control flow of heat exchange from chamber 138 to either pilot nozzle 140 to pilot nozzle 142. Compression spring 144 biases magnetic vane 136 towards the pilot nozzle 140.

The reversing valve structure is located adjacent the heat exchange fluid inlet 128 in order to locate temperature responsive element 146 in a position responsive to the temperature of the incoming heat exchange fluid. Springs 148 and 150 cooperate together to keep the temperature responsive element 146, lower valve seat 152, valve ball 154, floating valve seat 156, and valve ball 158 in operative relationship with one another.

The main valve consists basically of a valve head 160 which is reciprocated in valve chamber 162 between valve port 164 and valve port 166 in response to the forces exerted on diaphragm 168. Valve head 160 is directly connected to diaphragm 168 by connecting rod 170. Diaphragm 168 separates the upper casting 127 and the lower casting 126 into a top chamber 172 and a lower chamber 174. A needle member 175 is secured in the diaphragm to clean restrictors 176 and 178 each time the diaphragm member is reciprocated.

Operation of FIGURES 2–10

The operation of FIGURES 2–10 is identical to that shown schematically in FIGURE 1. FIGURES 2–10 are all shown in the position when hot heat exchange fluid is being supplied and the temperature responsive element is in the area being conditionedd and calling for heat. In all positions of the valve control, fluid is supplied from inlet valve chamber 180 to pivot valve chamber 138 through magnetic strainer 182 to remove impurities, and conduit 184. Magnetic strainer not only removes dirt and other nonmagnetic particles but also removes particles of material in the fluid system which will tend to affect the magnetic operation of the pilot valve.

The warm heat exchange fluid entering inlet port 128 into chamber 180 will cause temperature responsive element 146 to expand forcing valve ball 154, floating valve seat 156, valve ball spacer 192, and valve ball 158 upwardly against the bias of spring 150 to open the valve port 151, open valve port 157 in floating valve seat 156, close valve port 153 in floating valve seat 156, and close valve port 159. The reversing valve is now in the heating position.

In the position shown, bellows 120 is in a contracted position allowing magnet 114 to pivot towards the pilot valve thereby attracting magnetic vane 136 and thereby closing pilot nozzle 142. Control fluid then flows into pilot nozzle 140, through conduit 186, into floating valve 156 through openings 188, through passages 190 in valve ball spacer 192, and through conduit 194 into the top diaphragm chamber 172 causing diaphragm 168 and valve 160 to move downwardly to close valve port 166 and open valve port 164. Hot heat exchange fluid will now flow through inlet port 128 and outlet port 130 to the heat exchange coil and valve port 164. Hot heat exchange fluid will now flow through inlet port 128 and outlet port 130 to the heat exchange coil and will return from the heat exchange coil through re-entrant port 132 and return port 134 to the source of heat.

Assuming now that the temperature in the conditioned space is satisfied, the bellows 120 will assume its expanded position pivoting magnet 114 away from the pilot valve and allowing compression spring 144 to pivot magnetic vane 136 to the position where pilot nozzle 140 is closed and pilot nozzle 142 is open. Control fluid then passes through pilot nozzle 142, conduit 196, spring chamber 198, conduit 200, ports 202 of lower valve seat 152, port 151 of lower valve seat 152, conduit 204, and into lower diaphragm chamber 174. The force of the control fluid entering chamber 174 will move diaphragm 168 and valve head 160 upwardly closing valve port 164 and opening valve port 166 and thereby cutting off the flow of heat exchange fluid through the heat exhange coil (not shown).

As previously explained, fluid conduit 206 in conjunction with restrictors 176 and 178 allow the diaphragm to be moved upwardly or downwardly depending on whether control fluid is being delivered to the top or bottom diaphragm chamber.

Cooling

When cooling heat exchange fluid is being supplied to valve chamber 180, temperature sensitive element 146 of the reversing valve will contract allowing spring 150 to force valve ball 158, valve ball spacer 192, floating valve seat 156, and valve ball 154 downwardly resulting in the closing of valve ports 151 and 157 and opening valve ports 159 and 153. This reversing valve is now in the position to control the flow of cold heat exchange fluid to the heat exchange coil.

Assuming now that the area being conditioned requires cooling, the bellows 120 will be expanded pivoting magnet 114 away from the pilot valve against the bias of compression spring 118. Magnetic vane 136 will then be pivoted by spring 144 to the position closing pilot nozzle 140 and opening pilot nozzle 142. Control fluid from chamber 138 of the pilot valve will pass through pilot nozzle 142, conduit 196, valve port 159, and conduit 194 into the top diaphragm chamber 172 causing diaphragm chamber 172 causing diaphragm 168 and valve head 160 to be moved downwardly to open valve port 164 and closing valve port 166. Cold heat exchange fluid will now flow through inlet and outlet ports 128 and 130 respectively to the heat exchange coil. The cool return heat exchange fluid will return to the source through valve ports 132 and 134, respectively.

When the temperature of the area being conditioned has been reduced to a predetermined level the bellows 120, in response to the temperature sensed by the thermostat (not shown), will assume its contracted position allowing compression spring 118 to pivot magnet 114 towards the pilot valve. Magnet 114 will attract magnet vane 136 causing it to pivot against the bias of compression spring 144 to a position closing pilot nozzle 142 and opening pilot nozzle 140. Control fluid from pilot valve chamber 138 will be then delivered to the lower diaphragm chamber 172 through pilot nozzle 140, conduit 186, openinings 188 in floating valve 156, passages 190 in valve ball spacer 192, valve port 153, and conduit 204. Diaphragm 168 and valve head 160 will be urged upwardly closing valve port 164 and opening valve port 166 and thereby cutting off the flow of cold heat exchange fluid through the heat exchange coil. Obviously the cold heat exchange fluid will bypass from the inlet port 128 to the return port 134.

I have provided a new and novel self contained valve which is compact and requires no external source of power to operate. My new and novel valve employs the heat exchange fluid of the system as a motive power to not only control the action of the main valve, but to also reverse the operation of the valve when the system is changed over from heating to cooling and vice versa.

Although I have described in detail the preferred embodiment of my invention, I contemplate that many changes may be made without departing from the scope or spirit of my invention, and I desire to be limited only by the claims.

1. A temperature regulator for automatically controlling the flow of either a heating medium or a cooling medium comprising: valve means adapted to control the flow of heat exchange fluid to a heat exchange member, means forming an enclosure, movable wall means dividing said enclosure into a first chamber and a second chamber, said movable wall means being connected to said valve means, a pilot valve, conduit means adapted to supply heat exchange fluid to said pilot valve, a pair of pilot nozzles, a magnetic attractable vane pivotally supported in said pilot valve between said pair of pilot nozzles, said pilot nozzles being in fluid communiaction with said first chamber and said second chamber, thermostatic reversing valve means connected to said pilot nozzles adapted to direct the flow of heat exchange fluid from one of said pilot nozzles to said first chamber and from the other of said pilot onzzles to said second chamber when warm heat exchange fluid is being supplied, said thermostatic reversing valve means adapted to reverse the flow from said pilot nozzles to said chambers in response to a change in temeprature of the heat exchange fluid, and a theromstatically controlled magnetic means supported adjacent to and external of said pilot valve to attract said vane under certain predetermined temperature conditions to close off one of said pilot nozzles and open the other of said pilot nozzles.

2. The structure of claim 1 wherein said conduit means adapted to supply heat exchange fluid to said pilot valve includes means for preventing magnetic debris from entering said pilot valve.

3. A temperature regulator for automatically controlling the flow of either a heating medium or a cooling medium comprising: a valve casing, means forming an inlet port and an outlet port in said valve casing, valve means in said casing between said inlet port and said outlet port adapted to control the flow of heat exchange fluid therebetween, means forming an enclosure in said casing, movable wall means dividing said enclosure into a first chamber and a second chamber, said movable wall means being connected to said valve means, a pilot valve in fluid communication with said first chamber and said second chamber, conduit means adapted to supply heat exchange fluid to said pilot valve, control means responsive to the temperature of the space being conditioned mounted on an external surface of said casing in operable relationship with said pilot valve, said pilot valve being adapted to direct heat exchange fluid to each of said first chamber and said second chamber in response to the temperature sensed by said control means, and thermostatic valve means in said casing in heat exchange relationship with the heat exchange fluid passing from said inlet port to said outlet port to reverse the action of said pilot valve when the temperature of the heat exchange fluid is changed from hot to cold or vice versa.

4. The structure of claim 3 wherein said movable wall means is a flexible diaphragm member.

5. A temperature regulator system for automatically controlling the flow of either a heating medium or a cooling medium comprising: a valve casing, a first valve port in said casing adapted to receive a heat exchange fluid from a conditioned source, a second valve port in said casing adapted to be connected to a heat exchanger, a third valve port in said casing adapted to receive heat exchange fluid from said heat exchanger, a fourth valve port in said casing adapted to return heat exchange fluid to the conditioned source, valve means in said casing between said third valve port and said fourth valve port to control the flow of heat exchange fluid therebetween, means forming an enclosure in said casing, movable wall means dividing said enclosure into a first chamber and a second chamber and being connected to said valve means, a pilot valve in said casing in fluid communication with said first chamber and said second chamber, conduit means in said valve casing adapted to supply heat exchange fluid to said pilot valve, control means responsive to the temperature of the space to be conditioned mounted external of said casing in operable relationship with said pilot valve, said pilot valve adapted to direct said heat exchange fluid to said first chamber or said second chamber in response to the temperature sensed by said control means, and thermostatic valve means in said casing in heat exchange relationship with the heat exchange fluid to reverse the action of said pilot valve when the temperature of the heat exchange ffuid is changed from hot to cold or vice versa.

6. The structure of claim 5 wherein said thermostatic control means is mounted on an external surface of said valve casing.

7. A temperature regulator system for automatically controlling the flow of either a heating medium or a cooling medium comprising: a valve casing, a first valve port in said casing adapted for the introduction of a heat exchange fluid from a conditioned source, a second valve port in said casing adapted for the flow of heat exchange fluid to a heat exchanger, a third valve port in said casing adapted for the return of heat exchange fluid from said heat exchanger, a fourth valve port in said casing adapted for the return of heat exchange fluid to the conditioned source, valve means in said casing between said third valve port and said fourth valve port adapted to control the flow of heat exchange fluid therebetween, means forming an enclosure in said casing, movable wall means dividing said enclosure into a first chamber and a second chamber being connected to said valve means, a pilot valve in said casing, conduit means in said valve casing adapted to supply heat exchange fluid to said pilot valve, a pair of pilot nozzles, a magnetic attractable vane pivotally supported in said pilot valve between said pair of pilot nozzles, said pilot nozzles being in fluid communication with said first chamber and said second chamber, a thermostatic reversing valve means in said valve casing connected to said pilot nozzles adapted to direct the flow of heat exchange fluid from one of said pilot nozzles to said first chamber and from the other of said pilot nozzles to said second chamber when warm heat exchange fluid is being supplied, said thermostatic reversing valve means reversing the flow from said pilot nozzles to said chambers in response to a change in temperature of the heat exchange fluid, and a thermostatically controlled magnetic means supported adjacent to and external of said pilot valve to attract said vane under certain predetermined temperature conditions to close off one of said pilot nozzles and open the other of said pilot nozzles.

8. The structure of claim 7 wherein said heat exchange fluid in said conduit means passes through a magnetic strainer means to remove magnetic attractable particles therefrom.

9. The structure of claim 8 wherein said thermostatic reversing means is responsive to the temperature of the heat exchange fluid passing from said first port to said second port.

10. A fluid flow control device for use in temperature conditioning systems employing a heat exchange fluid for heating and cooling a space comprising: valve means adapted to control the flow of heat exchange fluid for conditioning said space; means forming an enclosure; movable wall means dividing said enclosure into a first chamber and a second chamber; means operatively associating said movable wall means to said valve means for movement of said valve means in response to movement of said movable wall means; a pilot valve for controlling the movement of said movable wall means; said pilot valve including an inlet for receiving heat exchange fluid; first and second outlets; temperature responsive means for selectively closing one of said outlets in response to the temperature condition of said space; conduit means for providing fluid communication between said first outlet and said first chamber and for providing fluid communication between said second outlet and said second chamber, and means for reversing said conduit means.

11. A fluid flow control device as defined by claim 10 further including temperature sensing means adapted to sense the temperature of the heat exchange fluid to be controlled by said valve means; and wherein said means for reversing said conduit means is responsive to said temperature sensing means sensing a change from a first temperature to a lower second temperature.

12. A fluid flow control device as defined by claim 10 wherein said temperature responsive means includes magnetic vane means disposed internally of said pilot valve for selectively closing one of said outlets; and magnetic actuator means disposed externally of said pilot valve; and wherein a supply passage is provided for conducting heat exchange fluid to said pilot inlet, and a magnetic strainer means in said supply passage adapted to prevent magnetic debris from entering said pilot valve inlet.

13. A device as defined by claim 10 wherein said valve means includes at least one heat exchange fluid inlet and at least two fluid outlets, one of said outlets adapted to be connected to a heat exchanger in the space to be conditioned and the other of said outlets adapted to be connected to a heat exchange fluid return conduit, and means for selectively permitting flow out of one of said last mentioned outlets.

References Cited in the file of this patent

UNITED STATES PATENTS

| | | |
|---|---|---|
| 1,800,352 | Klees et al. | Apr. 14, 1931 |
| 2,353,692 | Cunningham | July 18, 1944 |
| 2,631,781 | Dillman | Mar. 17, 1953 |
| 2,646,932 | Frost | July 28, 1953 |
| 2,690,842 | Spluvak | Oct. 5, 1954 |
| 2,781,979 | Kraft | Feb. 19, 1957 |
| 2,838,179 | Thomas | June 10, 1958 |
| 2,936,121 | Buchel et al. | May 10, 1960 |
| 3,008,018 | Hammond | Nov. 7, 1961 |
| 3,019,985 | Grosjean | Feb. 6, 1962 |
| 3,036,778 | Dillman | May 29, 1962 |

FOREIGN PATENTS

| | | |
|---|---|---|
| 864,469 | Great Britain | Apr. 6, 1961 |